Aug. 26, 1947.  J. D. MATLOCK  2,426,365
SERVICE BRAKE MECHANISM AND BRAKE-CONTROLLED
DRIVING MEANS FOR MOTOR VEHICLES
Filed Jan. 5, 1944  4 Sheets-Sheet 4

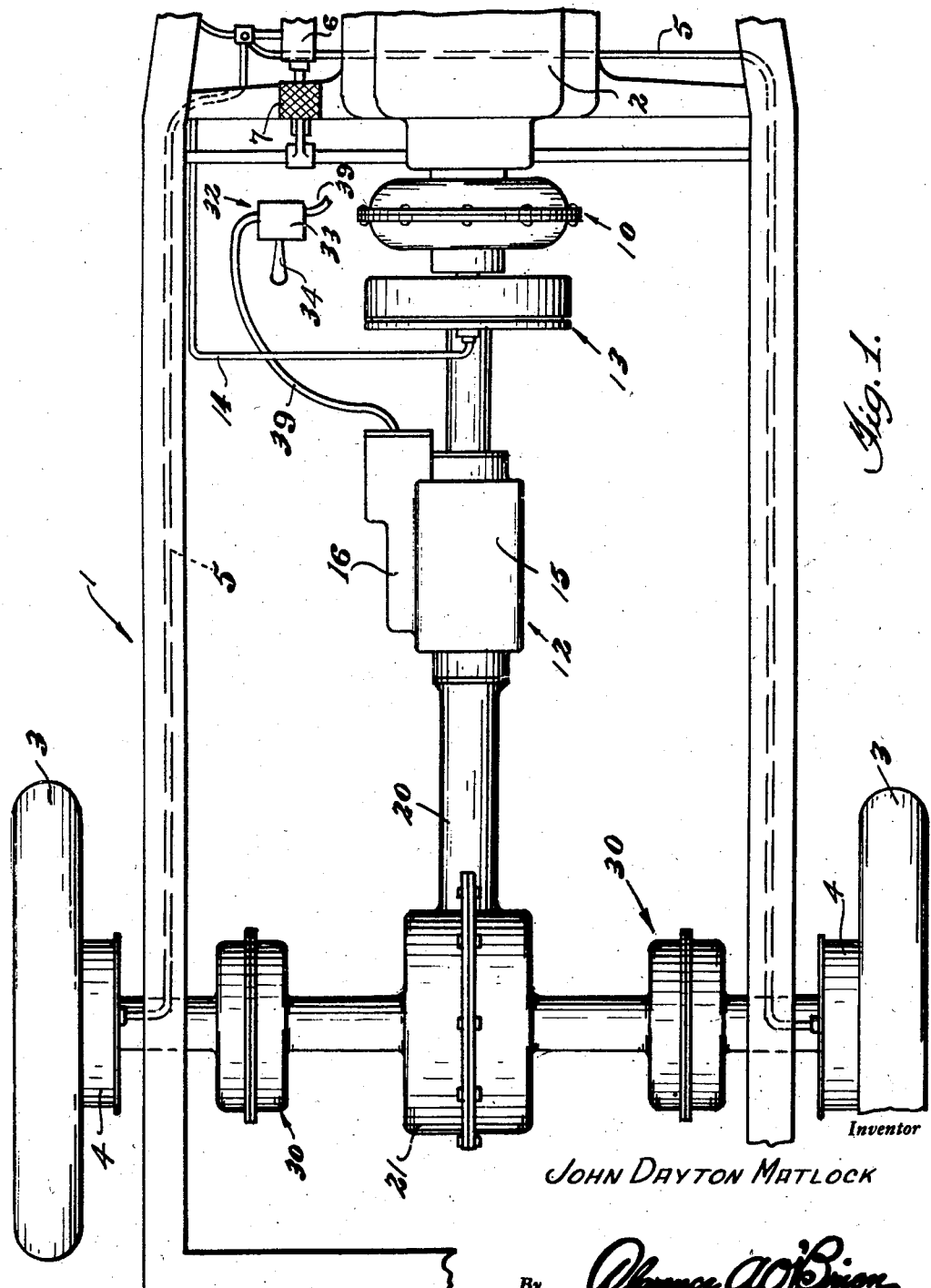

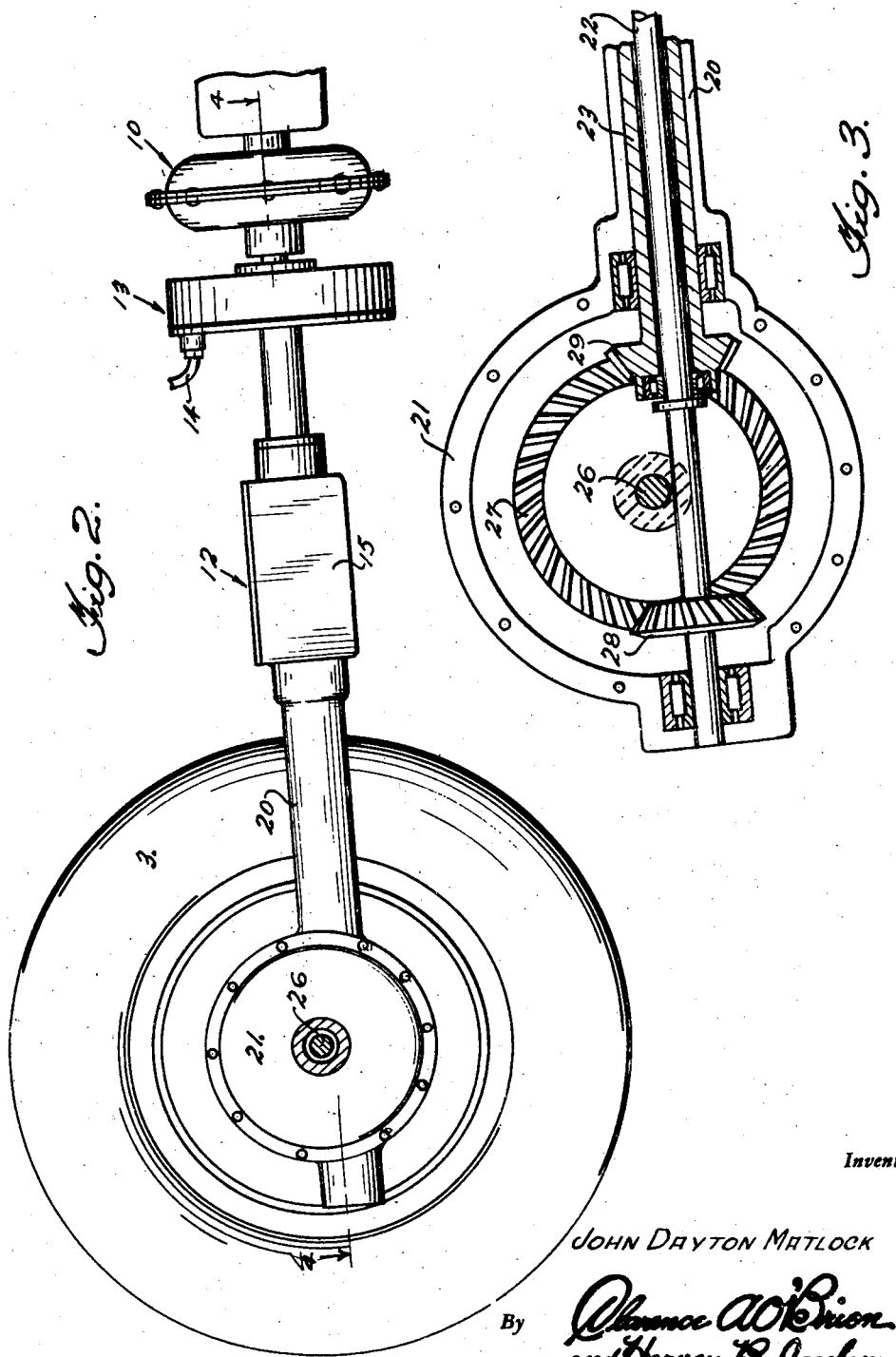

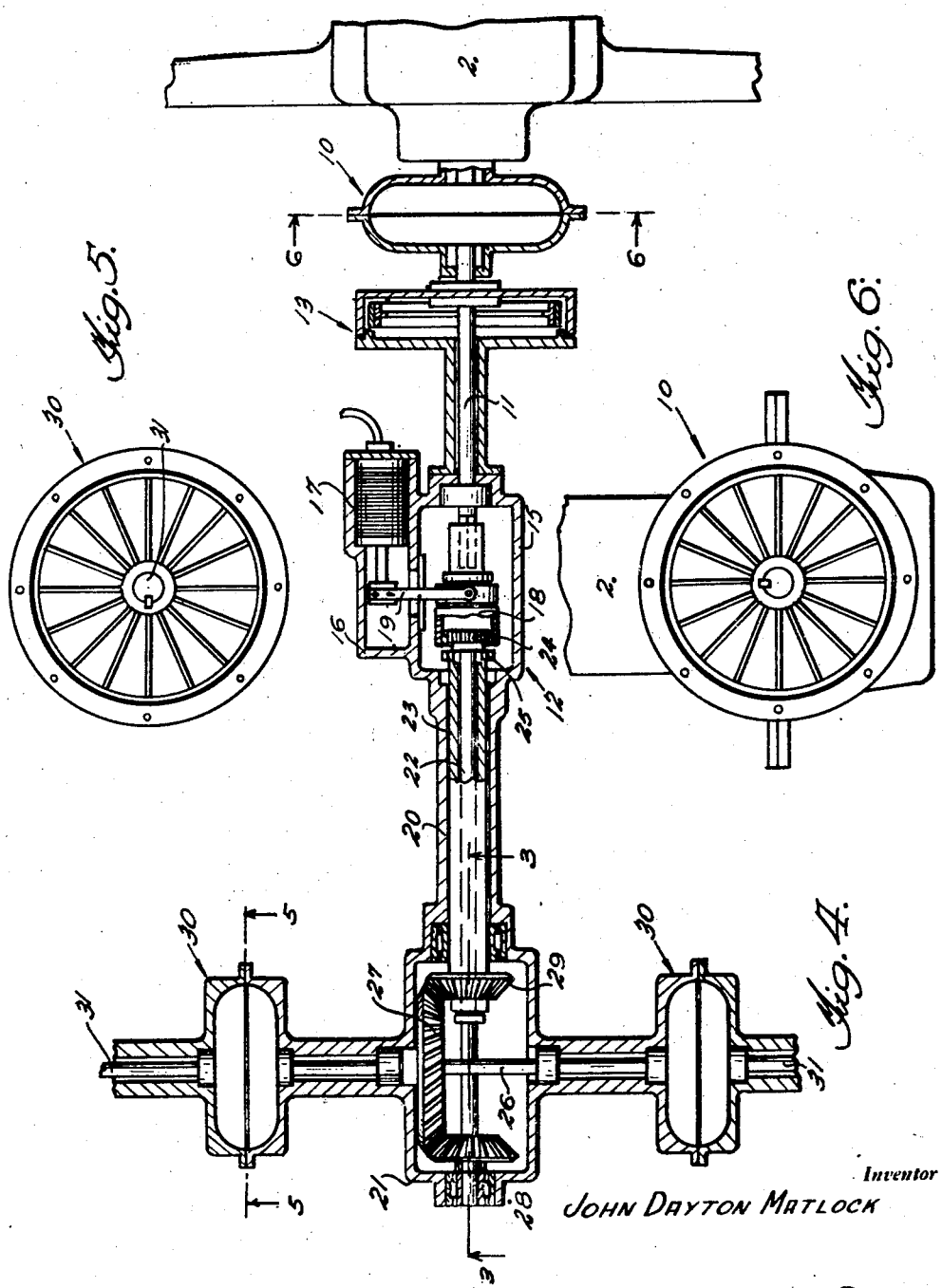

Inventor
JOHN DAYTON MATLOCK

By *Clarence A. O'Brien*
*and Harvey B. Jackson*
Attorneys

Patented Aug. 26, 1947

2,426,365

UNITED STATES PATENT OFFICE 2,426,365

SERVICE BRAKE MECHANISM AND BRAKE-CONTROLLED DRIVING MEANS FOR MOTOR VEHICLES

John Dayton Matlock, Hope, Ark., assignor of fifty per cent to William T. Matlock, Arkadelphia, Ark.

Application January 5, 1944, Serial No. 517,095

3 Claims. (Cl. 180—70)

1

The present invention relates to new and useful improvements in motor vehicle drives, and has for its primary object to provide, in a manner as hereinafter set forth, a novel construction, combination and arrangement for propelling vehicles at any desired speed, either forwardly or in reverse, without the usual clutch, differential, et cetera.

Another very important object of the invention is to provide a drive of the aforementioned character comprising novel means for positively preventing operation of the forward, reverse or neutral control means unless the brakes of the vehicle are applied.

Other objects of the invention are to provide a motor vehicle drive of the character described which will be comparatively simple in construction, strong, durable, highly efficient and reliable in operation, compact, light in weight and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a motor vehicle drive constructed in accordance with the present invention.

Figure 2 is a view in side elevation thereof, showing one of the housings and the shaft therein in cross section.

Figure 3 is a view in vertical longitudinal section through the rear portion of the drive, taken substantially on the line 3—3 of Figure 4.

Figure 4 is a view in horizontal section, taken substantially on the line 4—4 of Figure 2.

Figure 5 is a vertical sectional view, taken substantially on the line 5—5 of Figure 4.

Figure 6 is a cross sectional view, taken substantially on the line 6—6 of Figure 4.

Figure 7:
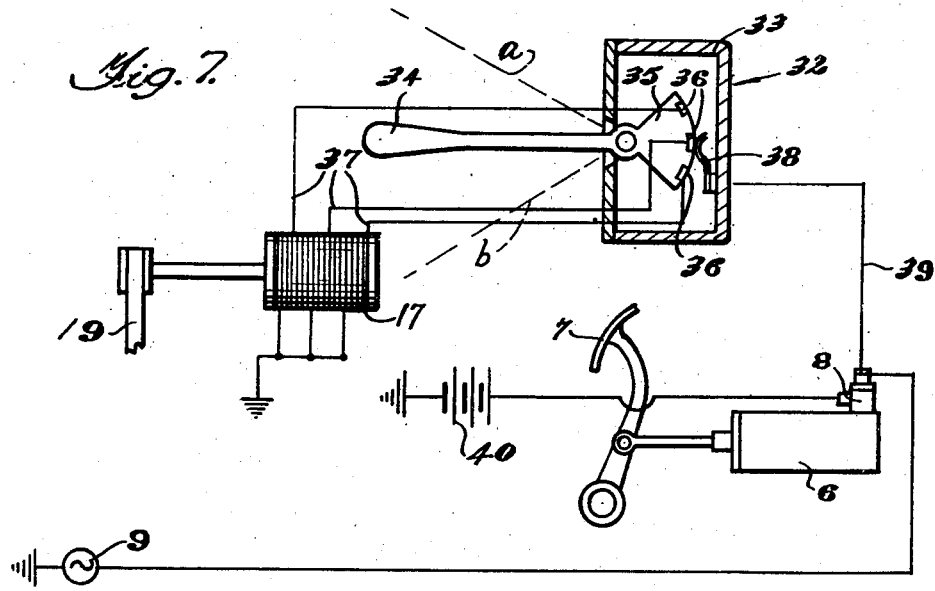
Figure 7 is a diagrammatic view showing the circuit wiring for the clutch shifting electromagnet and the manually operable and brake pedal operated switches for controlling said electromagnet.

Referring now to the drawings in detail, it will be seen that reference character 1 designates generally a portion of a vehicle frame having mounted therein an engine 2. The frame 1 is mounted on wheels 3 which are equipped with conventional

2 hydraulic brakes 4. The brakes 4 are connected by fluid lines 5 to a master cylinder 6 having operatively connected thereto a foot pedal 7. A switch 8 on the master cylinder 6 controls a stop light 9.

Mounted on the rear end of the engine 2 and operatively connected to the crank shaft thereof is a hydraulic clutch 10. The clutch 10 drives a shaft 11 which extends rearwardly to a transmission 12. Mounted on the shaft 11 between the hydraulic clutch 10 and the transmission 12 is a hydraulic brake 13 which is connected by a line 14 to the master cylinder 6 for stopping said shaft 11 when the brakes 4 of the vehicle are applied.

The transmission 12 includes a case 15 comprising a chamber 16 having mounted therein a three-way or position electromagnet 17. The transmission 12 further includes a clutch 18 which is splined on the rear end portion of the shaft 11 for longitudinal sliding movement in the case 15. A yoke 19 connects the clutch 18 to the electromagnet 17 for shifting thereby.

A tubular housing 20 connects the transmission case 15 to a gear housing 21. Inner and outer shafts 22 and 23, respectively, are mounted in the tubular housing 20 and project into the case 15 and the gear housing 21. At their forward ends, the shafts 22 and 23 are provided, respectively, with clutch members 24 and 25. The clutch 18 is engageable selectively with the members 24 and 25 for connecting either of the shafts 22 or 23 to the shaft 11 for actuation thereby.

A transverse shaft 26 is journaled in the housing 21 and has fixed thereon a gear 27. Gears 28 and 29 are fixed on the rear end portions of the shafts 22 and 23, respectively, and engaged with the gear 27 for driving the shaft 26 in opposite directions. Hydraulic clutches 30 connect the shaft 26 to the axles 31 of the rear wheels 3 of the vehicle.

As illustrated to advantage in Figure 7 of the drawings, the electromagnet 17 is controlled by a switch 32. The switch 32 includes a housing 33 having journaled therein a hand lever 34. A segment 35 is fixed on the pivoted end of the lever 34 in the housing 33. Spaced insulated contacts 36 are provided on the periphery of the segment 35. The contacts 36 are electrically connected by conductors 37 to the three-way or position electromagnet 17. A brush 38 in the housing 33 rides on the periphery of the segment 35 and is engageable with the contacts 36. The brush 38 is electrically connected by a conductor 39 to the stop switch 8 for receiving current from the usual battery 40 of the motor vehicle when said stop light switch 8 is closed.

It is thought that the operation of the invention as thus far described will be readily apparent from a consideration of the foregoing. Briefly, with the clutch 18 in neutral position, both of the shafts 22 and 23 are free of or disconnected from the shaft 11. With the switch 32 in neutral position, as seen in Figure 7 of the drawings, and with the brakes 4 of the vehicle applied, the brake 13 is also applied. The switch 8 is closed and, therefore, the electromagnet 17 is energized through the switch 32. If it is desired to propel the vehicle forwardly, for example, the switch 32 is thrown to the position a of Figure 7 for energizing the electromagnet 17 for shifting the clutch 18 into engagement with the clutch member 25, thereby connecting the shaft 23 to the shaft 11 for propelling the vehicle in a forward direction. To reverse the drive the brakes 4 and 13 are again applied, thus stopping the shaft 11 while permitting the engine 2 to idle. By throwing the switch 32 to the position b of Figure 7, the electromagnet 17 is energized for shifting the clutch 18 into engagement with the member 24 on the shaft 22 as shown in Figure 4. Thus, the shaft 26 is driven in the opposite direction. From the foregoing it will be seen that the electromagnet 17 cannot be energized for shifting the clutch 18 unless the brakes 4 and 13 are applied.

Figure 8:
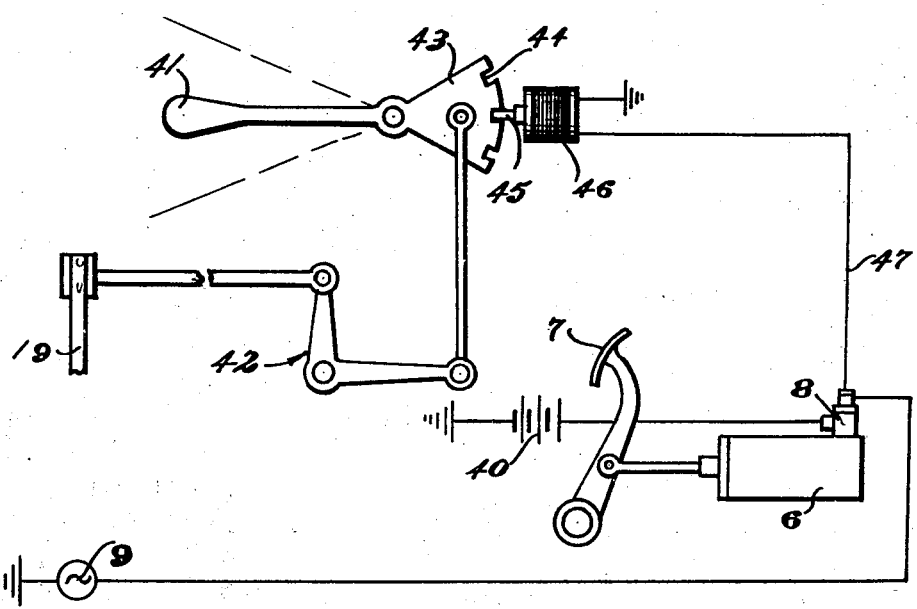
Figure 8 is a view similar to Figure 7 showing a modification of the clutch operating means and controlling means therefor.

In the modification illustrated in Figure 8 of the drawings, a hand lever 41 is operatively connected to the clutch 18 by suitable means including a system of links and levers 42. A segment 43 is provided on the pivoted end of the hand lever 41, said segment having in its periphery a series of spaced notches 44. A bolt 45 is engageable in the notches 44 for locking the lever 41 against operation, said bolt being retracted by an electromagnet 46. The electromagnet 46 is connected by a conductor 47 to the stop light switch 8 of the vehicle for energization thereby when the brakes 4 and 13 are applied.

In operation, if the brakes 4 and 13 are not on, the switch 8 is open and the electromagnet 46 is de-energized. Thus, the bolt 45, which is spring-projected, is engaged in one of the notches 44 and the lever 41 is locked against operation. It will accordingly be seen that the clutch 18 cannot be shifted. To shift the clutch 18, the brakes 4 and 13 of the vehicle are applied, thus closing the stop light switch 18 for energizing the electromagnet 46. In this manner the bolt 45 is retracted, thereby releasing the lever 41 and permitting operation thereof for shifting the clutch 18.

It is believed that the many advantages of a vehicle drive constructed in accordance with the present invention will be readily understood, and although preferred embodiments are as illustrated and described, it is to be understood that further modifications and changes in the details of construction may be resorted to which will fall within the scope of the invention as claimed.

What is claimed is:

1. In a motor vehicle, the combination of a longitudinal driving shaft, rear traction wheels at opposite sides of the vehicle, a transverse driven shaft operatively connected at opposite ends to said rear traction wheels, concentric inner and outer longitudinal propeller shafts constantly connected to said driven shaft for respectively driving the latter in opposite directions, means including a clutch member selectively shiftable to the desired one of three positions to respectively disconnect said driving shaft from said propeller shafts, to connect said driving shaft to the inner propeller shaft, or to connect said driving shaft to the outer propeller shaft, means to selectively shift said clutch member to any desired one of said positions, service brakes for said driving shaft and said rear traction wheels, foot-actuated operating means for said brakes, and means controlled by the brake operating means for preventing actuation of the clutch member shifting means when the brakes are released and for conditioning the clutch member shifting means for actuation of the clutch member when the brakes are applied.

2. In a motor vehicle, the combination of a longitudinal driving shaft, rear traction wheels at opposite sides of the vehicle, a transverse driven shaft operatively connected at opposite ends to said rear traction wheels, concentric inner and outer longitudinal propeller shafts constantly connected to said driven shaft for respectively driving the latter in opposite directions, means including a clutch member selectively shiftable to the desired one of three positions to respectively disconnect said driving shaft from said propeller shafts to connect said driving shaft to the inner propeller shaft, or to connect said driving shaft to the outer propeller shaft, manually controlled power-operated means to selectively shift said clutch member to any desired one of said positions, service brakes for said driving shaft and said rear traction wheels, foot-actuated operating means for said brakes, and means controlled by the brake-operating means for preventing actuation of the clutch member shifting means when the brakes are released and for conditioning the clutch member shifting means for actuation of the clutch member when the brakes are applied, said clutch member shifting means including a three-position electro-magnet operatively connected to the clutch member and a hand-operated multiple-throw switch for controlling the position to which said clutch member is moved by the electromagnet, the fourth-named means embodying a switch actuated by the brake-operating means for controlling the supply of current to said hand-operated switch.

3. In a motor vehicle, the combination of a longitudinal driving shaft, rear traction wheels at opposite sides of the vehicle, a transverse driven shaft operatively connected at opposite ends to said rear traction wheels, concentric inner and outer longitudinal propeller shafts constantly connected to said driven shaft for respectively driving the latter in opposite directions, means including a clutch member selectively shiftable to the desired one of three positions to respectively disconnect said driving shaft from said propeller shafts, to connect said driving shaft to the inner propeller shaft, or to connect said driving shaft to the outer propeller shaft, means to selectively shift said clutch member to any desired one of said positions, service brakes for said driving shaft and said rear traction wheels, foot-actuated operating means for said brakes, and electrically released and spring-engaged means controlled by the brake-operating means for preventing actuation of the clutch member shifting means when the brakes are released and for conditioning the clutch member shifting means for actuation of the clutch member when the brakes are applied, said clutch member shifting means including a hand lever operatively connected to the clutch member, said means for preventing actuation of the clutch member shifting means including a movable element for locking the hand lever in a position wherein the clutch member is disconnected from said propeller shafts and an actuator for said movable element, and a switch actuated by the brake-operating means for controlling supply of current to said actuator so as to energize the latter and release said movable element when the brakes are applied and to de-energize said actuator and permit engagement of the movable element with the hand lever when the brakes are released.

JOHN DAYTON MATLOCK.

REFERENCES CITED

The following references are of record in the file of this patent:

UNITED STATES PATENTS

| Number | Name | Date |
|---|---|---|
| 1,978,172 | Sinclair | Oct. 23, 1934 |
| 2,287,498 | Scofield | June 23, 1942 |
| 1,269,530 | Gargett | June 11, 1918 |
| 1,846,187 | Coulter | Feb. 23, 1932 |
| 1,883,743 | Maybach | Oct. 18, 1932 |
| 2,176,897 | Fodor | Oct. 24, 1939 |
| 2,259,810 | Freeman | Oct. 21, 1941 |
| 2,104,608 | Cox et al. | Jan. 4, 1938 |
| 2,306,521 | Cameron | Dec. 29, 1942 |
| 2,201,118 | Beede | May 14, 1940 |
| 1,873,458 | Murnane | Aug. 23, 1932 |
| 921,754 | Van Dyke et al. | May 18, 1909 |

FOREIGN PATENTS

| Number | Country | Date |
|---|---|---|
| 285,970 | Great Britain | Feb. 23, 1928 |